United States Patent
Le Bars et al.

(10) Patent No.: US 8,635,588 B2
(45) Date of Patent: Jan. 21, 2014

(54) SYSTEM AND METHOD FOR RECONCILING SOFTWARE SOURCE CODE

(75) Inventors: Herve Le Bars, Villemoisson-sur-orge (FR); Philippe Bauquel, Batz sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 12/329,012

(22) Filed: Dec. 5, 2008

(65) Prior Publication Data

US 2010/0122234 A1 May 13, 2010

(30) Foreign Application Priority Data

Nov. 12, 2008 (EP) .................................... 08305798

(51) Int. Cl.
*G06F 9/44* (2006.01)
(52) U.S. Cl.
USPC ............................ 717/106; 717/126; 717/170
(58) Field of Classification Search
USPC ........................................................ 717/106
See application file for complete search history.

(56) References Cited

U.S. PATENT DOCUMENTS

| | | | |
|---|---|---|---|
| 5,898,872 A * | 4/1999 | Richley | 717/121 |
| 6,654,953 B1 * | 11/2003 | Beaumont et al. | 717/158 |
| 7,032,210 B2 * | 4/2006 | Alloing et al. | 717/106 |
| 7,814,499 B2 * | 10/2010 | Straube et al. | 719/313 |
| 2003/0101330 A1 * | 5/2003 | Duesterwald et al. | 712/32 |
| 2003/0101431 A1 * | 5/2003 | Duesterwald et al. | 717/111 |
| 2004/0176087 A1 * | 9/2004 | Fam | 455/419 |
| 2005/0097542 A1 * | 5/2005 | Lee | 717/168 |
| 2006/0150141 A1 * | 7/2006 | Hong et al. | 717/105 |
| 2006/0161913 A1 * | 7/2006 | Barrs et al. | 717/170 |
| 2006/0282480 A1 * | 12/2006 | Johnson et al. | 707/203 |
| 2008/0140728 A1 * | 6/2008 | Fraser et al. | 707/200 |

* cited by examiner

*Primary Examiner* — Don Wong
*Assistant Examiner* — Theodore Hebert
(74) *Attorney, Agent, or Firm* — Cantor Colburn LLP; Jeannie Ray-Yarletts

(57) ABSTRACT

A system and a method for reconciling software source code is provided. The method includes analyzing a first file of generated source code and a modified file of source code to identify a first user modification in a portion of the modified file of source code, utilizing a first reconciliation tag, a first start index, a first stop index. The method further includes reconciling the first file of generated source code, the modified file of source code, and a second file of generated source code by inserting the first user modification in a portion of the second file of generated source code, utilizing a second reconciliation tag, a second start index, and a second stop index. The method further includes storing the second file of generated source code with the first user modification in a memory device.

4 Claims, 10 Drawing Sheets

| First file of generated source code | First file of reconciliation tags |
|---|---|
| String zipCode = "";<br>String getZipCode() { return zipCode; }<br>void setZipCode( String newZipCode ) { zipCode = newZipCode; }<br>46 | Tag#1: ID=ZipCodeInitialValue, startIdx=17, stopIdx=19.<br>(Note that included text in the tag ZipCodeInitialValue is "")<br>48 |
| Modified file of source code | User modifications File |
| String zipCode = "10000";<br>String getZipCode() { return zipCode; }<br>void setZipCode( String newZipCode ) { zipCode = newZipCode; }<br>50 | User Change#1:<br>TagID=ZipCodeInitialValue,<br>modifiedText="10000"<br>54 |
| Second file of generated source code | Second file of reconciliation tags |
| String zipCode;<br>String getZipCode() {<br>  if ( zipCode == null ) zipCode = "";<br>  return zipCode;<br>}<br>void setZipCode( String newZipCode ) { zipCode = newZipCode; }<br>56 | Tag#1: ID=ZipCodeInitialValue, startIdx=75, stopIdx=77.<br>(Note that included text in the tag ZipCodeInitialValue is "")<br>58 |
| Reconciled file of source code | Message file |
| String zipCode;<br>String getZipCode() {<br>  if ( zipCode == null ) zipCode = "10000";<br>  return zipCode;<br>}<br>void setZipCode( String newZipCode ) { zipCode = newZipCode; }<br>62 | User Change#1:<br>TagID=ZipCodeInitialValue,<br>modifiedText="10000"<br>64 |

FIG. 3

| First file of generated source code | | First file of reconciliation tags | |
|---|---|---|---|
| String zipCode = "";<br>String getZipCode() { return zipCode; }<br>void setZipCode( String newZipCode ) { zipCode = newZipCode; } | 146 | Tag#1: ID=ZipCodeInitialValue, startIdx=17, stopIdx=19.<br>(Note that included text in the tag ZipCodeInitialValue is "") | 148 |
| Modified file of source code | | User modifications File | |
| String zipCode = "10000";<br>String getZipCode() { return zipCode; }<br>void setZipCode( String newZipCode ) { zipCode = newZipCode; } | 150 | User Change#1:<br>TagID=ZipCodeInitialValue, modifiedText="10000" | 154 |
| Second file of generated source code | | Second file of reconciliation tags | |
| String zcode;<br>String getZcode() {<br>  if ( zcode == null ) zcode = "";<br>  return zcode;<br>}<br>void setZcode( String newZcode ) { zcode = newZcode; } | 156 | Tag#1: ID=ZipCodeInitialValue, startIdx=67, stopIdx=69.<br>(Note that included text in the tag ZipCodeInitialValue is "") | 158 |
| Reconciled file of source code | | Message file | |
| String zcode;<br>String getZcode() {<br>  if ( zcode == null ) zcode = "10000";<br>  return zcode;<br>}<br>void setZcode( String newZcode ) { zcode = newZcode; } | 162 | User Change#1:<br>TagID=ZipCodeInitialValue, modifiedText="10000" | 164 |

FIG. 4

| First file of generated source code | First file of reconciliation tags |
|---|---|
| String zipCode = "";<br>String getZipCode() { return zipCode; }<br>void setZipCode( String newZipCode ) { zipCode = newZipCode; } <u>246</u> | Tag#1: ID=ZipCodeInitialValue, startIdx=17, stopIdx=19. <u>248</u><br>(Note that included text in the tag ZipCodeInitialValue is "") |
| Modified file of source code | User modifications File |
| String zipCode = "10000";<br>String getZipCode() { return zipCode; }<br>void setZipCode( String newZipCode ) { zipCode = newZipCode; } <u>250</u> | User Change#1:<br>TagID=ZipCodeInitialValue, modifiedText="10000" <u>254</u> |
| Second file of generated source code | Second file of reconciliation tags |
| String zcode;<br>String getZcode() {<br>  if ( zcode == null ) zcode = "ZZZZZ";<br>  return zcode;<br>}<br>void setZcode( String newZcode ) { zcode = newZcode; } <u>256</u> | Tag#1: ID=ZipCodeInitialValue, startIdx=67, stopIdx=69. <u>258</u><br>(Note that included text in the tag ZipCodeInitialValue is "ZZZZZ") |
| Reconciled file of source code | Message file |
| String zcode;<br>String getZcode() {<br>  if ( zcode == null ) zcode = "10000";<br>  return zcode;<br>}<br>void setZcode( String newZcode ) { zcode = newZcode; } <u>262</u> | User Change#1:<br>TagID=ZipCodeInitialValue, modifiedText="10000"<br>ReconciliationWarning#1:<br>Text="The overwritten generated code has changed",<br>startIdx=67, stopIdx=74 <u>264</u> |

FIG. 5

| | |
|---|---|
| First file of generated source code | First file of reconciliation tags |
| class Address {<br>String country = "",<br>String zipCode = "",<br>String city = "",<br>}<br>_346_ | Tag#1: ID=CountryDeclaration, startIdx=16, stopIdx=36.<br>Tag#2: ID=ZipCodeDeclaration, startIdx=37, stopIdx=57.<br>Tag#3: ID=CityDeclaration, startIdx=58, stopIdx=75.<br>_348_ |
| Modified file of source code | User modifications File |
| class Address {<br>String country = "",<br>String zipCode = "10000",<br>String city = "",<br>}<br>_350_ | User Change#1:<br>TagID=ZipCodeDeclaration,<br>modifiedText="String zipCode = "10000";<br>_354_ |
| Second file of generated source code | Second file of reconciliation tags |
| class Address {<br>String country = "",<br>String city = "",<br>}<br>_356_ | Tag#1: ID=CountryDeclaration, startIdx=16, stopIdx=36.<br>Tag#2: ID=CityDeclaration, startIdx=37, stopIdx=54.<br>_358_ |
| Reconciled file of source code | Message file |
| class Address {<br>String country = "",<br>String city = "",<br>}<br>_362_ | ReconciliationWarning#1:<br>Text="A change could not be reinjected in this generated code",<br>startIdx=37, stopIdx=37.<br>_364_ |

FIG. 6

SYSTEM AND METHOD FOR RECONCILING SOFTWARE SOURCE CODE

CROSS REFERENCE TO RELATED APPLICATIONS

This application claims priority to European application number EP08305798.4, filed Nov. 12, 2008, the contents of which are incorporated herein by reference in its entirety.

BACKGROUND

The present application is directed to a system and a method for reconciling software source code.

A code generator can generate source code for an application utilizing an application model. Thereafter, a software developer can manually modify a portion of the generated source code using a text editor. The software developer can modify the source code by inserting new source code or deleting source code for example. At a later time, the code generator can generate updated source code utilizing a modified application model, or a new code generator can be utilized to generate updated source code. A problem that occurs with the updated source code is that the updated source code does not include the manually modified portions of source code.

Accordingly, the inventors herein have recognized a need for a system and a method that reconcile software source code that minimizes and/or eliminates the above mentioned deficiency.

SUMMARY

A method for reconciling software source code in accordance with exemplary embodiment is provided. The method includes retrieving a first file of generated source code, a first portion of the first file of generated source code having at least a first reconciliation tag, a first start index, and a first stop index associated therewith. The first start index and the first stop index indicate a position and an extent of the first portion. The method further includes retrieving a modified file of source code corresponding to the first file of generated source code with at least a first user modification in a modified portion of the modified file of source code. The method further includes retrieving a second file of generated source code, a second portion of the second file of generated source code having a second reconciliation tag, a second start index, and a second stop index associated therewith. The second reconciliation tag has a name identical to a name of the first reconciliation tag. The second start index and the second stop index indicate a position and an extent of the second portion. The method further includes analyzing the first file of generated source code and the modified file of source code to determine if the modified portion of the modified file of source code logically corresponds to the first portion of source code linked to the first reconciliation tag. The method further includes if the modified portion of the modified file of source code logically corresponds to the first portion of source code linked to the first reconciliation tag, then reconciling the first file of generated source code, the modified file of source code, and the second file of generated source code by generating a reconciled file of source code that has source code corresponding to the first user modification being applied in the second portion of the second file of generated source code, utilizing the second reconciliation tag, the second start index, the second stop index. The method further includes storing the reconciled file of source code in a memory device.

A system for reconciling software source code in accordance with another exemplary embodiment is provided. The system includes a memory device and a computer operably communicating with the memory device. The computer is configured to retrieve a first file of generated source code from the memory device. A first portion of the first file of generated source code has at least a first reconciliation tag, a first start index, and a first stop index associated therewith. The first start index and the first stop index indicate a position and an extent of the first portion. The computer is further configured to retrieve a modified file of source code from the memory device. The modified file of source code corresponds to the first file of generated source code with at least a first user modification in a modified portion of the modified file of source code. The computer is further configured to retrieve a second file of generated source code from the memory device. A second portion of the second file of generated source code has a second reconciliation tag, a second start index, and a second stop index associated therewith. The second reconciliation tag has a name identical to a name of the first reconciliation tag. The second start index and the second stop index indicate a position and an extent of the second portion. The computer is further configured to analyze the first file of generated source code and the modified file of source code to determine if the modified portion of the modified file of source code logically corresponds to the first portion of source code linked to the first reconciliation tag. The computer is further configured to reconcile the first file of generated source code, the modified file of source code, and the second file of generated source code by generating a reconciled file of source code that has source code corresponding to the first user modification being applied in the second portion of the second file of generated source code, utilizing the second reconciliation tag, the second start index, the second stop index, if the modified portion of the modified file of source code logically corresponds to the first portion of source code linked to the first reconciliation tag. The computer is further configured to store the reconciled file of source code in the memory device.

A method for reconciling software source code in accordance with another exemplary embodiment is provided. The method includes retrieving a first file of generated source code, a first portion of the first file of generated source code having at least a first reconciliation tag, a first start index, and a first stop index associated therewith. The first start index and the first stop index indicate a position and an extent of the first portion. The method further includes retrieving a modified file of source code corresponding to the first file of generated source code with at least a first user modification in a modified portion of the modified file of source code. The method further includes retrieving a second file of generated source code that does not have a reconciliation tag having a name identical to a name of the first reconciliation tag. The method further includes analyzing the first file of generated source code and the modified file of source code to determine if the modified portion of the modified file of source code logically corresponds to the first portion of source code linked to the first reconciliation tag. The method further includes determining that the second file of generated source code cannot be reconciled with the first file of generated source code and the modified file of source code when the second file of generated source code does not have a reconciliation tag having a name corresponding to a name of the first reconciliation tag. The method further includes generating an error message indicating that the first user modification cannot be reconciled with the second file of generated source code. The method further includes storing the error message in a memory device.

A system for reconciling software source code in accordance with another in embodiment is provided. The system includes a memory device and a computer operably communicating with the memory device. The computer is configured to retrieve a first file of generated source code from the memory device. A first portion of the first file of generated source code has at least a first reconciliation tag, a first start index, and a first stop index associated therewith. The first start index and the first stop index indicate a position and an extent of the first portion. The computer is further configured to retrieve a modified file of source code from the memory device. The modified file of source code corresponds to the first file of generated source code with at least a first user modification in a modified portion of the modified file of source code. The computer is further configured to retrieve a second file of generated source code that does not have a reconciliation tag having a name identical to a name of the first reconciliation tag. The computer is further configured to analyze the first file of generated source code and the modified file of source code to determine if the modified portion of the modified file of source code logically corresponds to the first portion of source code linked to the first reconciliation tag. The computer is further configured to determine that the second file of generated source code cannot be reconciled with the first file of generated source code and the modified file of source code when the second file of generated source code does not have a reconciliation tag having a name corresponding to a name of the first reconciliation tag. The computer is further configured to generate an error message indicating that the first user modification cannot be reconciled with the second file of generated source code. The computer is further configured to store the error message in the memory device.

BRIEF DESCRIPTION OF THE SEVERAL VIEWS OF THE DRAWINGS

FIG. 3 is a schematic of exemplary files utilized by the system of FIG. 1;

FIG. 4 is a schematic of other exemplary files utilized by the system of FIG. 1;

FIG. 5 is a schematic of other exemplary files utilized by the system of FIG. 1;

FIG. 6 is a schematic of other exemplary files utilized by the system of FIG. 1;

DETAILED DESCRIPTION

Figure 1:
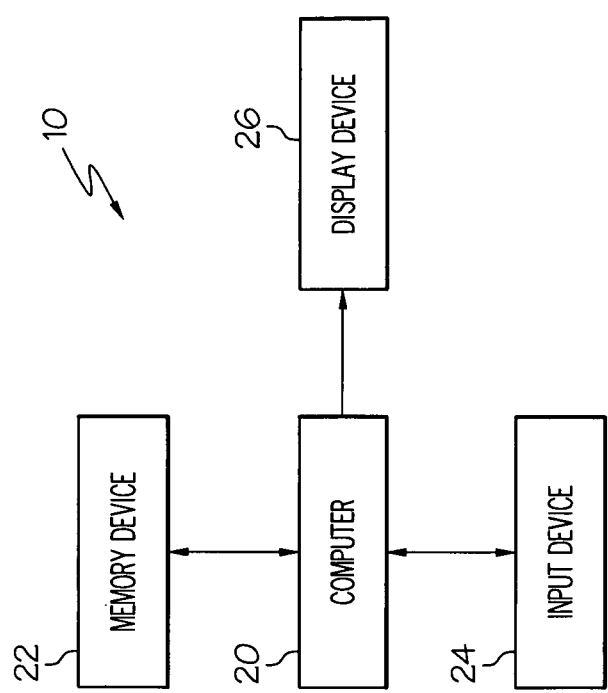
FIG. 1 is a schematic of a system for reconciling software source code in accordance with an exemplary embodiment.

Referring to FIG. 1, a system 10 for reconciling generated software source code in accordance with an exemplary embodiment is illustrated. The system 10 includes a computer 20, a memory device 22, an input device 24, and a display device 26. The computer 20 is configured to execute algorithms for implementing methods described herein. The computer 20 is operably coupled to the memory device 22, the input device 24, and the display device 26. The memory device 22 is configured to store applications, modules, files and data utilized by the computer 20. The input device 24 is configured to allow a user to input data is received by the computer 20. The display device 26 is configured to display data and messages generated by the computer 20.

A simple example illustrating the use of reconciliation tags to reconciliate source code files will now be provided. Assume that a code generator has generated a first file of generated source code and a first file of reconciliation tags, each tag being linked to the generated source code using start and stop indexes. Assume that one reconciliation tag "Foo" is linked to the portion of text "Hello world" in the generated source code. Next, a user makes a modification in this portion of text, so that this portion of text becomes "Hello wonderful world" in a modified file of source code. Then, assume that a second file of generated source code and a second file of reconciliation tags are generated by the code generator. The goal of the reconciliation method is to create a reconciled file of source code, based on the second file of generated source code and taking into account the user modification. First, the reconciliation method extracts the user modification, comparing the first file of generated source code and the modified file of source code. Using the first file of reconciliation tags, the extract user modification module will determine that the portion of text that is linked to the reconciliation tag "Foo" has been modified by the user. Knowing that the user modification is linked to the reconciliation tag "Foo", the reconciliation method will search for a tag "Foo" in the second file of reconciliation tags. If a reconciliation tag "Foo" exists in the second file of reconciliation tags, the user modification can be applied to the second file of source code. To apply the user modification to the second file of source code, a textual reconciliation module will merge the three portions of text ("Hello world", "Hello wonderful world" and the portion text that is linked to the tag "Foo" in the second file of generated source code) to obtain the reconciled file of source code. If no reconciliation tag "Foo" exist in the second file of reconciliation tags, the user modification can't be taken into account in the second file of generated source code. In this case, the reconciliation method will create an error message indicating that the user modification can't be taken into account in the second file of generated source code.

Figure 2:
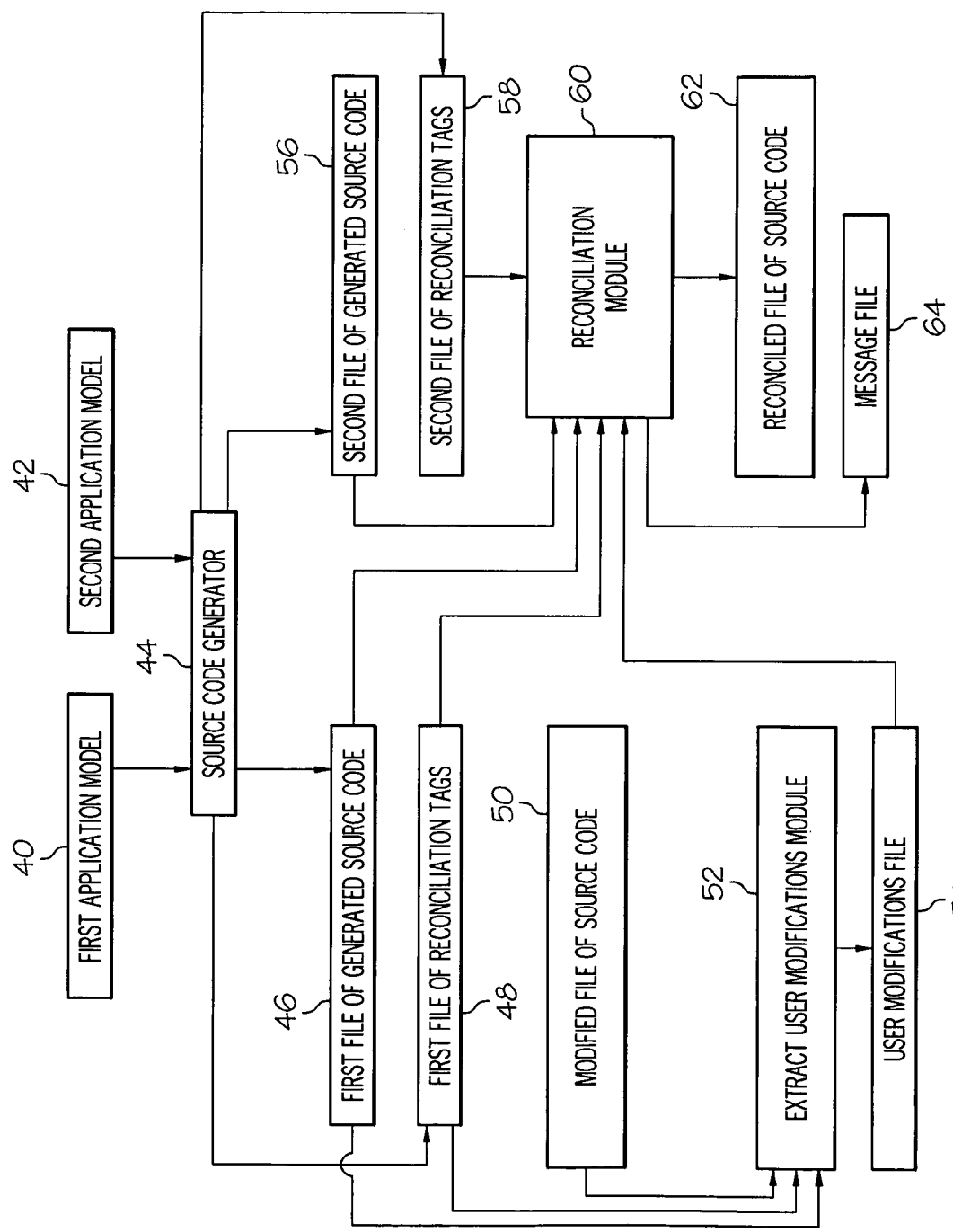
FIG. 2 is a schematic of software applications and files utilized by the system of FIG. 1 for reconciling software source code.

Referring to FIGS. 2 and 3, exemplary software applications and files utilized by the system of FIG. 1 for reconciling software source code will now be explained. A first application model 40 is utilized by the source code generator 44 for automatically generating the first file of generated source code 46 and the first file of reconciliation tags 48.

The first file of generated source code 46 contains source code that is automatically generated by the source code generator 44. For example, the first file of generated source code 46 can contain the following source code:

---

String zipCode = ""; String getZipCode( ) { return zipCode; }
void setZipCode( String newZipCode )
{ zipCode = newZipCode; }

---

The first file of reconciliation tags 48 contains reconciliation tags associated with portions of the first file of generated source code 46 for tracking changes to the source code by a user. For example, the first file of reconciliation tags 48 can contain the following information: Tag#1:

ID=ZipCodeInitialValue, startIdx=17, stopIdx=19. The reconciliation tag Tag#1 has the name or identifier "ZipCodeInitialValue ID" to support later comparisons with other reconciliation tags. The startIdx is a start index indicating a starting text position in the first file 48 for a portion of the source code linked to the tag ZipCodeInitialValue. The stopIdx is a stop index indicating a stopping text position in the first file 48 for the portion of source code linked to the tag ZipCodeInitialValue.

The modified file of source code 50 corresponds to the first file of generated source code 46 with modifications made by a user. In other words, the modified file 50 is substantially similar to the file 46 except that the modified file 50 includes additional user modifications to the source code. For example, the second file 50 can include the following source code:

String zipCode="10000";
String getZipCode( ) {return zipCode;}
void setZipCode(String newZipCode) {zipCode=newZipCode;} As shown, the user modification corresponds the insertion of "10000" in the source code.

The extract user modifications module 52 is configured to access the first file of generated source code 46, the first file of reconciliation tags 48, and the modified file of source code 50. Further, the extract user modifications module 52 is configured to generate a user modifications file 54 having data describing the user modifications in the modified file 50 relative to the first file 46, utilizing reconciliation tags in the first file of reconciliation tags 48. For example, the user modifications file 54 can include the following information: User Modification#1: TagID=ZipCodeInitialValue, modifiedText="10000"

A second application model 42 is utilized by the source code generator 44 for automatically generating the second file of generated source code 56 and the second file of reconciliation tags 58.

The second file of generated source code 56 contains source code that is automatically generated by the source code generator 44. For example, the second file of generated source code 56 can contain following source code:

```
String zipCode;
String getZipCode( ) {
    if ( zipCode == null ) zipCode = "";
    return zipCode;
}
void setZipCode( String newZipCode ) { zipCode = newZipCode; }
```

The second file of reconciliation tags 58 contains reconciliation tags associated with portions of the second file of generated source code 56 for reconciling the second file of generated source code 56 with the first and modified files 46, 50. For example, the second file of reconciliation tags 58 can contain the following information: Tag#1: ID=ZipCodeInitialValue, startIdx=75, stopIdx=77. The first reconciliation tag has the identifier "ZipCodeInitialValue" to support comparison with other reconciliation tags. The startIdx is a start index indicating a starting text position in the second file 56 for portion of source code linked to the tag ZipCodeInitialValue. The stopIdx is a stop index indicating a stopping text position in the second file 56 for the portion of source code linked to the tag ZipCodeInitialValue. As shown, the Tag#1 in the third file 56 corresponds to the Tag#1 in the first file 46 because they have the same identifier "ZipCodeInitialValue".

The reconciliation module 60 is configured to reconcile the second file of generated source code 56 with both the first file of generated source code 46 and the modified file of source code 50, and to generate a reconciled file of source code 62. The reconciled file of source code will take into account the user modifications made by the user in the modified file of source code when it is possible. As shown, the reconciliation module 60 operably communicates with the first file of generated source code 46, the first file of reconciliation tags 48, the modified file of source code 50, the user modifications file 54, the second file of generated source code 56, and the second file of reconciliation tags 58. For example, the reconciled file of source code 62 can contain following source code:

```
String zipCode;
String getZipCode( ) {
if ( zipCode == null ) zipCode = "10000";
return zipCode;
}
void setZipCode( String newZipCode ) { zipCode = newZipCode; }
```

As shown, the source code contains the text "10000" corresponding to the user modified source code.

The reconciliation module 60 is a further provided to generate and store a message indicating a user modification when reconciliation between the first file 46, the modified file of source code 50, and a third file 56 is possible. For example, the reconciliation module 60 can generate the following message which is stored in a message file 64: User Change#1: TagID=ZipCodeInitialValue, modifiedText="10000"

The reconciliation module 60 is further provided to generate and store a message in the message file 64 when a user modification found in the user modification file 54 can't be applied to the second file of generated source code 56. It should be noted that a user modification that is linked to a reconciliation tag of given ID can't be applied to the second file of generated source code if the second file of reconciliation tags do not include a reconciliation tag of same ID.

Referring to FIG. 4, a second set of exemplary files that can be generated and utilized by the system 10 will now explained. The second set of files includes a first file of generated source code 146, a first file of reconciliation tags 148, a modified file of source code 150, a user modifications file 154, a second file of generated source code 156, a second file of reconciliation tags 158, a reconciled file of source code 162, and a message file 164. The first file of reconciliation tags 148 is associated with the first file of generated source code 146. The second file of reconciliation tags 158 is associated with the second file of generated source code 156.

Referring to the first file of generated source code 146, the file contains the source code "String zipCode="". In the second file of generated source code 156, the source code is changed to: "String zcode." Accordingly, the variable name is changed from zipCode to zcode. The second set of a source code files illustrate that the reconciliation process can still be completed even if variable names are changed so long as the reconciliation tag IDs remain consistent between the first file of generated source code 146 and the second file of generated source code 156.

Referring to FIG. 5, a third set of exemplary files that can be generated and utilized by the system 10 will now explained. The third set of files includes a first file of generated source code 246, a first file of reconciliation tags 248, a modified file of source code 250, a user modifications file 254, a second file of generated source code 256, a second file of reconciliation tags 258, a reconciled file of source code 262, and a message file 264. The first file of reconciliation tags 248 is associated with the first file of generated source code 246. The second file of reconciliation tags 258 is associated with the second file of generated source code 256.

Referring to the first file of generated source code 246, the file contains the source code "String zipCode="". In the modified file of source code 250, the variable zipCode is assigned a value of "10000." In the second file of generated source code 256, the source code includes: "String zcode." Accordingly, in the third file 256, the variable name has changed from zipCode to zcode and the variable zcode is assigned a value of "ZZZZZ." In the reconciled file of source code 262, the value zcode is assigned a value "10000", which corresponds to the user modification in the modified file of source code 250. The third set of a source code files also illustrate that the reconciliation process can be completed even if variable names are changed so long as the reconciliation tag IDs remain consistent between the first file of generated source code and the second file of generated source code. Further, the message file 264 having a message "Reconciliation warning#1: Text="The overwritten generated code has changed", indicates that a reconciliation warning can be generated by the reconciliation process.

Referring to FIG. 6, a fourth set of exemplary files that can be generated and utilized by the system 10 will now explained. The fourth set of files includes a first file of generated source code 346, a first file of reconciliation tags 348, a modified file of source code 350, a user modifications file 354, a second file of generated source code 356, a second file of reconciliation tags 358, a reconciled file of source code 362, and a message file 364. The first file of reconciliation tags 348 is associated with the first file of generated source code 346. The second file of reconciliation tags 358 is associated with the third file of generated source code 356.

Referring to the first file of reconciliation tags 348, the file contains a reconciliation tag: "Tag#2 ID=ZipCodeDeclaration." Referring to the second file of reconciliation tags 358, the file does not contain a reconciliation tag of ID ZipCodeDeclaration. Accordingly, reconciliation of the user modification associated with a reconciliation tag "Tag#2 ID=ZipCodeDeclaration" cannot be accomplished. Accordingly, an error message in the message file 364 is generated.

Figure 7:
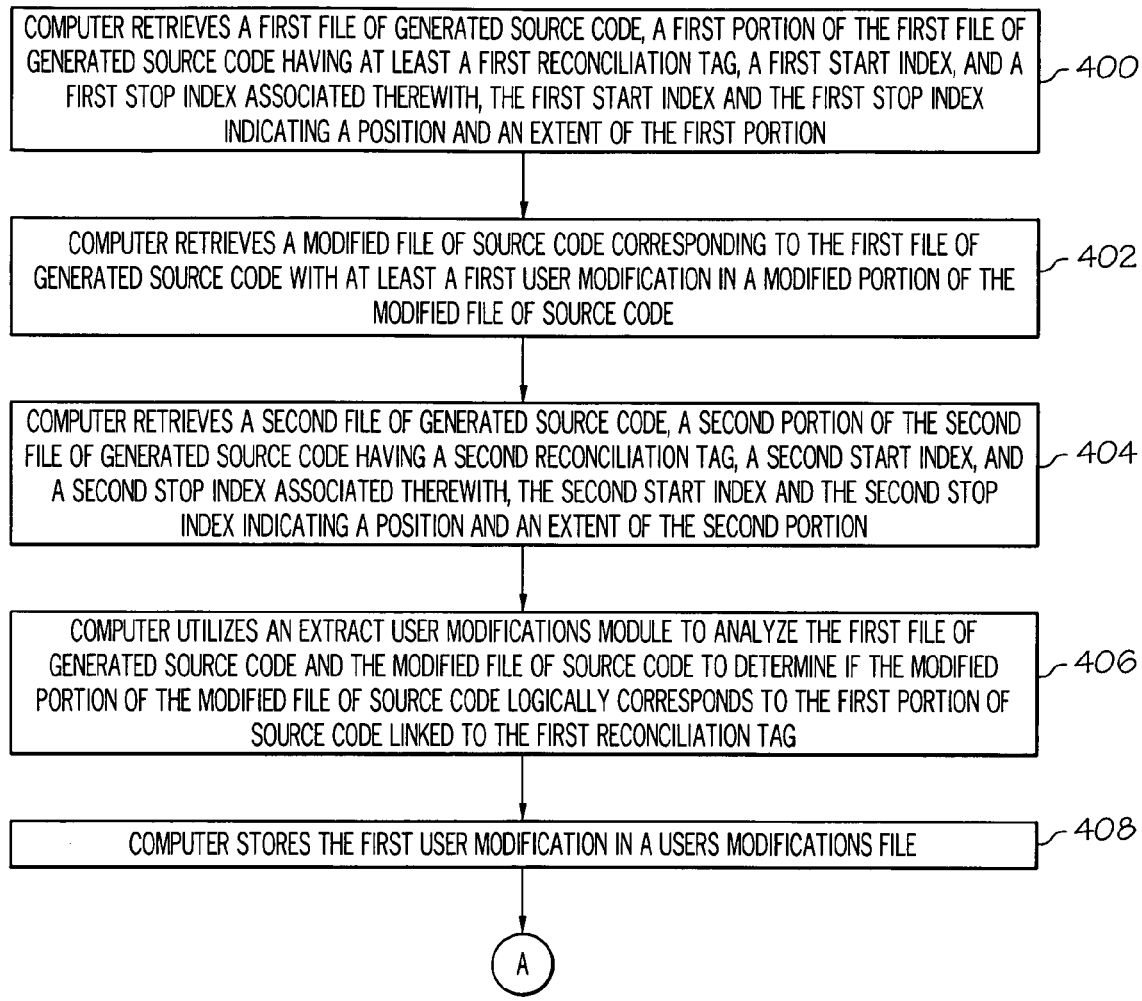
FIGS. 7-9 are flowcharts of a method for reconciling generated source code in accordance with another exemplary embodiment.
Figure 8:
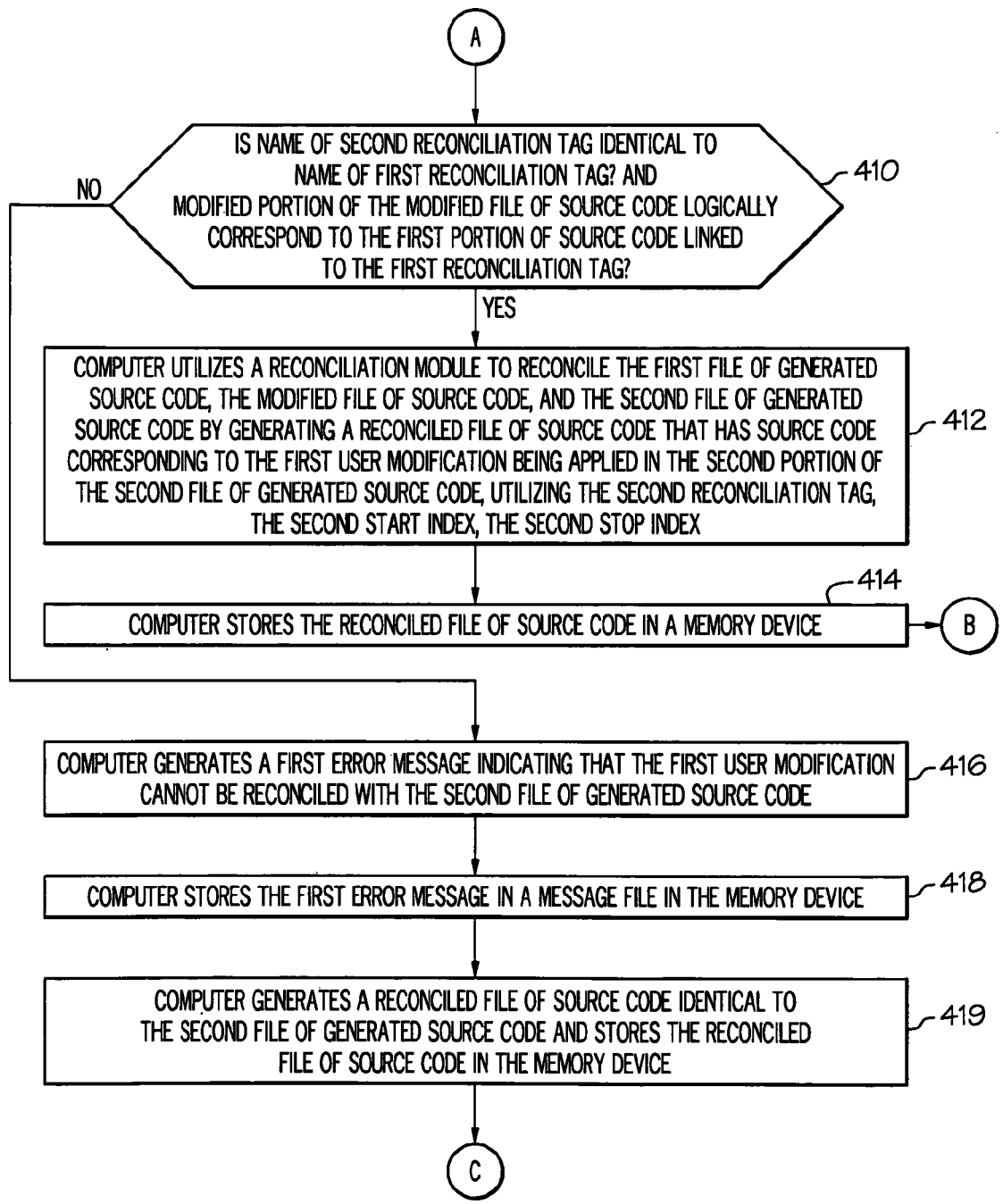
Figure 9:
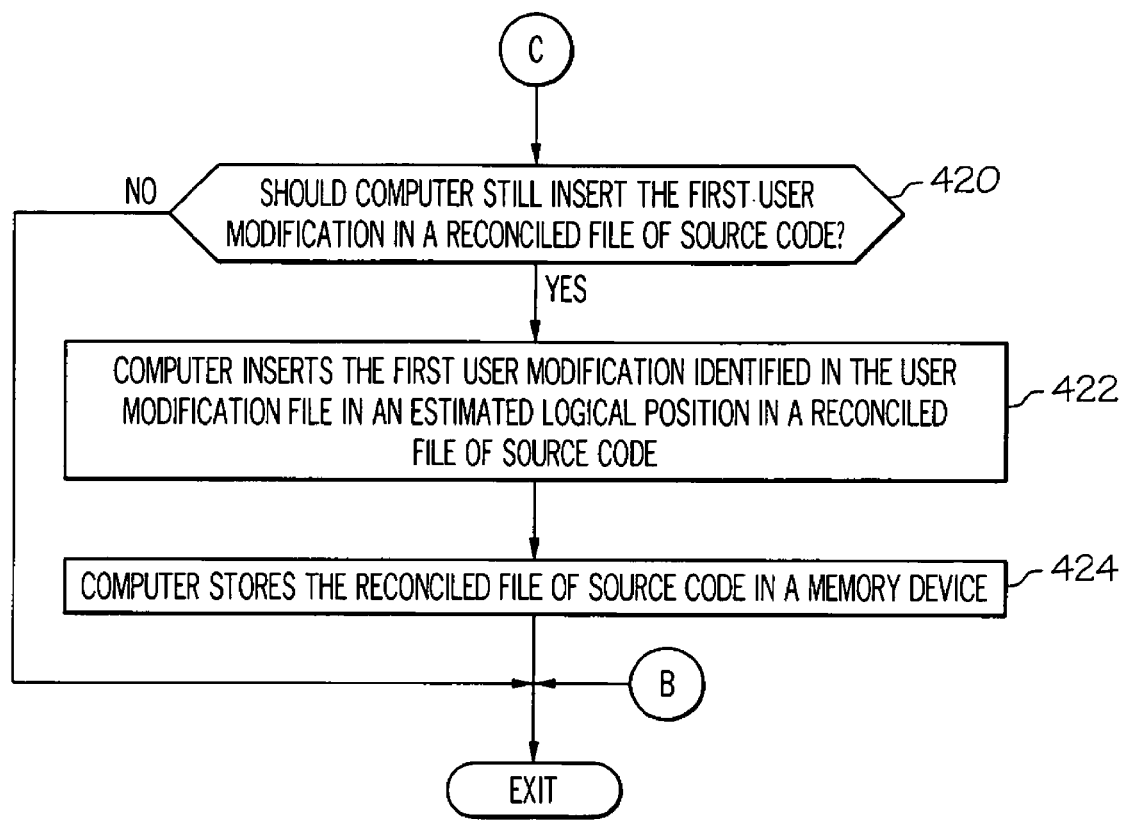

Referring to FIGS. 7-9, a flowchart of a method for reconciling software source code will now be explained.

At step 400, the computer 20 retrieves a first file of generated source code. A first portion of the first file of generated source code has at least a first reconciliation tag, a first start index, and a first stop index associated therewith. The first start index and the first stop index indicate a position and an extent of the first portion.

At step 402, the computer 20 retrieves a modified file of source code corresponding to the first file of generated source code with at least a first user modification in a modified portion of the modified file of source code.

At step 404, the computer 20 retrieves a second file of generated source code. A second portion of the second file of generated source code has a second reconciliation tag, a second start index, and a second stop index associated therewith. The second start index and the second stop index indicate a position and an extent of the second portion.

At step 406, the computer 20 utilizes an extract user modifications module 52 to analyze the first file of generated source code and the modified file of source code to determine if the modified portion of the modified file of source code logically corresponds to the first portion of source code linked to the first reconciliation tag At step 408, the computer 20 stores the first user modification in the users modifications file 54.

At step 410, the computer 20 makes a determination as to whether: (i) the name of second reconciliation tag identical to the name of first reconciliation tag, and (ii) whether the modified portion of the modified file of source code logically corresponds to the first portion of source code linked to the first reconciliation tag. If the value of step 410 equals "yes", the method advances to step 412. Otherwise, the method advances to step 416.

At step 412, the computer 20 utilizes the reconciliation module 60 to reconcile the first file of generated source code, the modified file of source code, and the second file of generated source code and to insert the first user modification identified in the user modification file 54 in the second portion of the second file of generated source code, utilizing the second reconciliation tag, the second start index, and the second stop index.

At step 414, the computer 20 stores the reconciled file of source code 62 in the memory device 20. After step 414, the method is exited.

Referring again to step 410, if the value of step 410 equals "no", the method advances to step 416. At step 416, the computer 20 generates a first error message indicating that the first user modification cannot be reconciled with the second file of generated source code.

At step 418, the computer 20 stores the first error message in the message file 64 in the memory device 22.

At step 419, the computer 20 generates a reconciled file of source code identical to the second file of generated source code and stores the reconciled file of source code in the memory device 22.

At step 420, the computer 20 makes a determination as to whether the computer 20 should still insert the first user modification in the second file of generated source code. If the value of step 420 equals "yes", the method advances to step 422. Otherwise, the method is exited.

At step 422, the computer 20 inserts the first user modification identified in the user modification file 54 in an estimated logical position in the reconciled file of source code 62.

At step 424, the computer 20 stores the reconciled file of source code 62 in the memory device 22. After step 424, the method is exited.

Figure 10:
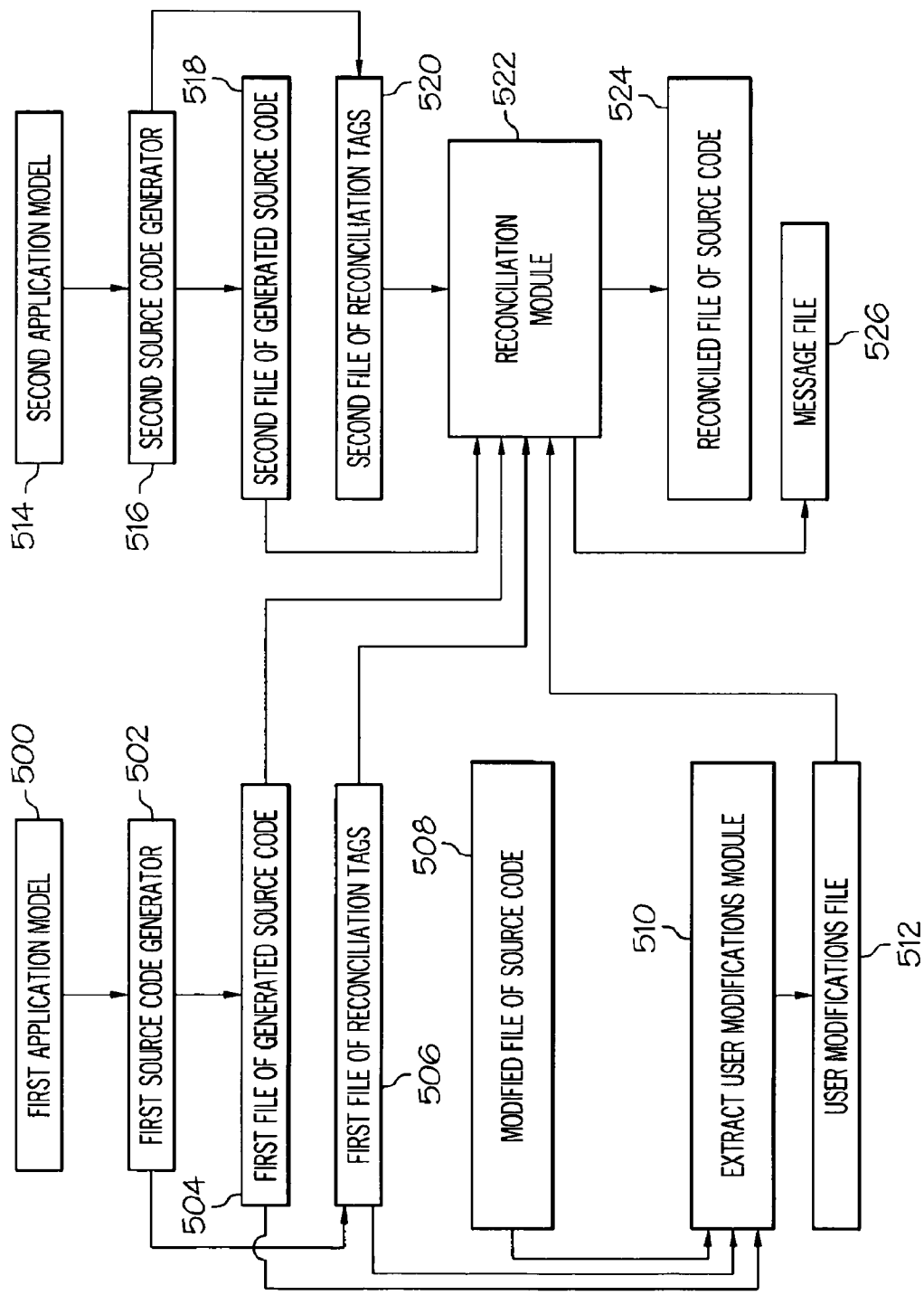
FIG. 10 a schematic of another system for reconciling software source code in accordance with another exemplary embodiment.

Referring to FIG. 10, another set of exemplary software applications and files that can be utilized by the system 10 for reconciling software source code will now be explained.

A first application model 500 has configuration data that is utilized by the source code generator 502 for automatically generating the first file of generated source code 504. The first file of generated source code 500 contains source code that is automatically generated by the source code generator 44.

The first file of reconciliation tags 506 contains reconciliation tags associated with portions of the first file of generated source code 504 for tracking changes to the source code by a user.

The modified file of source code 508 corresponds to the first file of generated source code 504 with modifications made by a user. In other words, the modified file of source code 508 is substantially similar to the file 504 except that the modified file of source code 508 includes user modifications to the source code.

The extract user modifications module 510 is configured to access the first file of generated source code 504, the first file of reconciliation tags 506, and the modified file of source code 508. Further, the extract user modifications module 510 is configured to generate a user modifications file 512 containing data describing the user modifications in the modified file of source code 506 as compared to the first file 504, utilizing the tags in the first file of reconciliation tags 506.

A second application model 514 has configuration data that is utilized by the second source code generator 516 for automatically generating the second file of generated source code 518. The second file of generated source code 518 contains source code that is automatically generated by the second source code generator 516.

The second file of reconciliation tags 518 contains reconciliation tags associated with portions of the second file of generated source code 518 for reconciling the second file of generated source code 518 with the first file 504 and the file of modified source code 508.

The reconciliation module 522 is configured to reconcile the second file of generated source code 518 with both the first file of generated source code 504 and the modified file of source code 508, and to generate a second file of generated source code with user modifications 524 if reconciliation is possible. As shown, the reconciliation module 522 operably communicates with the first file of generated source code 504, the first file of reconciliation tags 506, the modified file of source code 508, the user modifications file 512, the second file of generated source code 518, and the second file of reconciliation tags 520. The reconciliation module 522 is a further provided to generate a message indicating a user modification when reconciliation between the first file 504, the modified file of source code 508, and a third file 518 is possible.

The reconciliation module 522 is a further provided to generate and store a message in a message file 526 when reconciliation between the first file 504, the modified file of source code 508, and the third file 518 is not possible. It should be noted that reconciliation of a portion of the source code is not possible when a reconciliation tag is present in the first file 504 that is associated with the portion of source code, but an identical reconciliation tag is not present in the third file 518.

It should be noted that the methodology described in the flowchart of FIGS. 7-9 can also be implemented utilizing the applications, modules, and files of FIG. 10.

The above-described methods can be at least partially embodied in the form of one or more computer readable media having computer-executable instructions for practicing the methods. The computer-readable media can comprise one or more of the following: floppy diskettes, CD-ROMs, hard drives, flash memory, and other computer-readable media known to those skilled in the art; wherein, when the computer-executable instructions are loaded into and executed by one or more computers the one or more computers become an apparatus for practicing the invention.

The system and the method for reconciling software source code represent a substantial advantage over other systems and methods. In particular, the system and the method provide a technical effect of reconciling software source code using reconciliation tags associated with the software source code.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

What is claimed is:

1. A method for reconciling software source code, comprising:

retrieving a first file of generated source code, a first portion of the first file of generated source code having at least a first reconciliation tag, a first start index, and a first stop index associated therewith, the first start index and the first stop index indicating a position and an extent of the first portion;

retrieving a modified file of source code corresponding to the first file of generated source code with at least a first user modification in a modified portion of the modified file of source code;

retrieving a second file of generated source code, a second portion of the second file of generated source code having a second reconciliation tag, a second start index, and a second stop index associated therewith, the second reconciliation tag having a name identical to a name of the first reconciliation tag, the second start index and the second stop index indicating a position and an extent of the second portion;

analyzing the first file of generated source code and the modified file of source code to determine if the modified portion of the modified file of source code logically corresponds to the first portion of source code linked to the first reconciliation tag;

if the modified portion of the modified file of source code logically corresponds to the first portion of source code linked to the first reconciliation tag, then reconciling the first file of generated source code, the modified file of source code, and the second file of generated source code by generating a reconciled file of source code that has source code corresponding to the first user modification being applied in the second portion of the second file of generated source code, utilizing the second reconciliation tag, the second start index, the second stop index;

storing the reconciled file of source code in a memory device;

determining that the second file of generated source code cannot be reconciled with the first file of generated source code and the modified file of source code when the second file of generated source code does not have a reconciliation tag having a name corresponding to a name of the first reconciliation tag; and based on determining that the second file of generated source code cannot be reconciled with the first file of generated source code and the modified file of source code, generating an error message indicating that the first user modification cannot be reconciled with the second file of generated source code and storing the error message in a memory device.

2. A system for reconciling software source code, comprising:

a memory device;

a computer operably communicating with the memory device, the computer configured to retrieve a first file of generated source code from the memory device, a first portion of the first file of generated source code having at least a first reconciliation tag, a first start index, and a first stop index associated therewith, the first start index and the first stop index indicating a position and an extent of the first portion;

the computer further configured to retrieve a modified file of source code from the memory device, the modified file of source code corresponding to the first file of generated source code with at least a first user modification in a modified portion of the modified file of source code;

the computer further configured to retrieve a second file of generated source code from the memory device, a second portion of the second file of generated source code having a second reconciliation tag, a second start index, and a second stop index associated therewith, the second reconciliation tag having a name identical to a name of the first reconciliation tag, the second start index and the second stop index indicating a position and an extent of the second portion;

the computer further configured to analyze the first file of generated source code and the modified file of source code to determine if the modified portion of the modified file of source code logically corresponds to the first portion of source code linked to the first reconciliation tag;

the computer further configured to reconcile the first file of generated source code, the modified file of source code, and the second file of generated source code by generating a reconciled file of source code that has source code corresponding to the first user modification being applied in the second portion of the second file of generated source code, utilizing the second reconciliation tag, the second start index, the second stop index, if the modified portion of the modified file of source code logically corresponds to the first portion of source code linked to the first reconciliation tag;

the computer further configured to store the reconciled file of source code in the memory device; and the computer further configured to determine that the second file of generated source code cannot be reconciled with the first file of generated source code and the modified file of source code when the second file of generated source code does not have a reconciliation tag having a name corresponding to a name of the first reconciliation tag;

the computer further configured to generate an error message indicating that the first user modification cannot be reconciled with the second file of generated source code; and the computer further configured to store the error message in the memory device.

3. A method for reconciling software source code, comprising:

retrieving a first file of generated source code, a first portion of the first file of generated source code having at least a first reconciliation tag, a first start index, and a first stop index associated therewith, the first start index and the first stop index indicating a position and an extent of the first portion;

retrieving a modified file of source code corresponding to the first file of generated source code with at least a first user modification in a modified portion of the modified file of source code;

retrieving a second file of generated source code that does not have a reconciliation tag having a name identical to a name of the first reconciliation tag;

analyzing the first file of generated source code and the modified file of source code to determine if the modified portion of the modified file of source code logically corresponds to the first portion of source code linked to the first reconciliation tag;

determining that the second file of generated source code cannot be reconciled with the first file of generated source code and the modified file of source code when the second file of generated source code does not have a reconciliation tag having a name corresponding to a name of the first reconciliation tag;

generating an error message indicating that the first user modification cannot be reconciled with the second file of generated source code; and storing the error message in a memory device.

4. A system for reconciling software source code, comprising:

a memory device;

a computer operably communicating with the memory device, the computer configured to retrieve a first file of generated source code from the memory device, a first portion of the first file of generated source code having at least a first reconciliation tag, a first start index, and a first stop index associated therewith, the first start index and the first stop index indicating a position and an extent of the first portion;

the computer further configured to retrieve a modified file of source code from the memory device, the modified file of source code corresponding to the first file of generated source code with at least a first user modification in a modified portion of the modified file of source code;

the computer further configured to retrieve a second file of generated source code that does not have a reconciliation tag having a name identical to a name of the first reconciliation tag;

the computer further configured to analyze the first file of generated source code and the modified file of source code to determine if the modified portion of the modified file of source code logically corresponds to the first portion of source code linked to the first reconciliation tag;

the computer further configured to determine that the second file of generated source code cannot be reconciled with the first file of generated source code and the modified file of source code when the second file of generated source code does not have a reconciliation tag having a name corresponding to a name of the first reconciliation tag;

the computer further configured to generate an error message indicating that the first user modification cannot be reconciled with the second file of generated source code; and the computer further configured to store the error message in the memory device.

\* \* \* \* \*